United States Patent [19]
Baba et al.

[11] Patent Number: 5,582,027
[45] Date of Patent: Dec. 10, 1996

[54] MODULATOR INTEGRATED TYPE REFRIGERANT CONDENSER

[75] Inventors: Norimasa Baba, Nagoya; Ken Yamamoto, Obu; Michiyasu Yamamoto, Chiryu; Yasushi Yamanaka, Nakashima-gun; Hiroki Matsuo, Kariya; Haruhiko Otsuka, Okazaki; Yoshitaka Kuroda, Anjo; Kiyoshi Kittaka, Okazaki, all of Japan

[73] Assignee: Nippondenso Co., Ltd., Kariya, Japan

[21] Appl. No.: 413,103

[22] Filed: Mar. 29, 1995

[30] Foreign Application Priority Data

Mar. 29, 1994 [JP] Japan ................... 6-059403
Apr. 6, 1994 [JP] Japan ................... 6-068785

[51] Int. Cl.⁶ ............................ F25B 39/04; F28D 1/06
[52] U.S. Cl. ......................... 62/509; 165/132; 220/4.12
[58] Field of Search ............................ 62/509; 165/173, 165/132; 220/581, 4, 12

[56] References Cited

U.S. PATENT DOCUMENTS

| | | | |
|---|---|---|---|
| 1,645,944 | 10/1927 | Debor | 220/581 |
| 4,932,546 | 6/1990 | Stannard | 220/581 |
| 4,972,683 | 11/1990 | Beatenbough | 62/507 |
| 5,088,294 | 2/1992 | Ando | 62/509 X |
| 5,224,358 | 7/1993 | Yamanaka et al. | 62/509 |

FOREIGN PATENT DOCUMENTS

| | | |
|---|---|---|
| 4238853 | 5/1994 | Germany . |
| 2-37287 | 2/1990 | Japan . |
| 2103667 | 8/1990 | Japan . |
| 2267478 | 11/1990 | Japan . |
| 1030999 | 5/1966 | United Kingdom .......... 220/581 |

*Primary Examiner*—William E. Wayner
*Attorney, Agent, or Firm*—Cushman, Darby & Cushman; IP Group of Pillsbury; Madison & Sutro LLP

[57] ABSTRACT

The module integrated type refrigerant condenser includes a roughly cylindrical right side header connected to the outlets of a plurality of condensing tubes and the inlets of a plurality of supercooling tubes, and a modulator directly connected to the right side header in the width direction of the core. By providing a partition part for dividing the second inner space into two gas-liquid separation chambers, the modulator is formed into a shape as if two roughly cylindrical pipe bodies were stacked up in the thickness direction of the core, and the width thereof is made shorter in comparison with a simple, cylindrical modulator.

21 Claims, 10 Drawing Sheets

MODULATOR INTEGRATED TYPE REFRIGERANT CONDENSER

CROSS-REFERENCE TO RELATED APPLICATIONS

This application is related to and claims priority under 35 U.S.C. §119 from Japanese Patent Applications No. Hei. 6-59403 and Hei. 6-68785, the contents of which are incorporated herein by reference.

BACKGROUND OF THE INVENTION

1. Field of the Invention

The present invention generally relates to a modulator integrated type refrigerant condenser to be incorporated into the refrigerating cycle of air conditioners, freezers or refrigerators, for example. More particularly, the present invention relates to a modulator integrated type refrigerant condenser which can provide a large effective radiation area of a core in which a condensing part and a supercooling part are respectively disposed in the upper and lower parts thereof.

2. Description of the Related Art

Conventionally, a refrigerant condenser and a receiver jointly forming a refrigerating cycle of an air conditioner for a vehicle, for example, have been connected to the high-pressure side of the refrigerating cycle. For this structure, these components should have sufficient strength so they are not deformed or damaged under high pressure. For this reason, high-pressure containers for a refrigerant condenser such as a header and a receiver should preferably be cylindrically-shaped to meet the structural requirement.

A well-known example which can satisfy this structural requirement is a refrigerating cycle in which a refrigerant condenser and a receiver are separately and independently provided. In this arrangement, however, joints such as pipes should be provided to connect the outlet of the refrigerant condenser and the inlet of the receiver. This poses a problem in that the reduction of the number of parts, i.e., the reduction of the product cost and assembly productivity, is difficult due to these interconnections. Another problem with this arrangement is that since respective independent mounting spaces are required for the refrigerant condenser and the receiver, space cannot be utilized in the most efficient manner.

In view of these problems, Japanese Unexamined Utility Model No. 2-103667 discloses a modulator integrated type refrigerant condenser including a modulator having a second inner space extending in the height direction of a core is connected to the back wall of an outlet side header to which an outlet composed of a plurality of tubes is connected. Also, the modulator has a first inner space extending in the height direction of the core and a through passage for communicating between the first inner space of the outside header and the second inner space of the modulator.

Specifically, the modulator integrated type refrigerant condenser is structured so that, as indicated by the chained, double-dotted line in FIG. 1, the cylindrical modulator 102 larger in diameter than the outlet side header 101 is disposed adjacent to the outlet side header 101 in the width direction thereof (in the longitudinal direction of the plurality of tubes 38), and furthermore, the outlet of the outlet side header 101 communicates with the inlet of the modulator 102 via the through passage (not shown).

It should be noted, however, that the refrigerant circulating quantity within the refrigerating cycle varies depending on automotive driving conditions, the environment, etc., and that the modulator should have a volume of approximately 150 to 200 $cm^3$ to absorb the variations in the refrigerant quantity. In order to secure this much volume and enable the modulator to be mounted to the header of the refrigerant condenser, the cross-section of the modulator should be enlarged.

When the cross-section of the inner space of the modulator is enlarged in an attempt to solve this problem, it is natural that the bulk of the modulator increases. In other words, as the width of the bulk of the part of the modulator projecting from the header increases, the width of the dead space which does not contribute to the heat exchange of refrigerant with a heat medium increases.

In particular, when the mounting space of the refrigerant condenser can not be made arbitrarily large as is the case with an automotive engine compartment, the size of the refrigerant condenser in the width direction of the core should be shortened as much as the increase in the modulator volume, i.e., the dead space, and this adjustment poses a problem in that the effective radiation area of the core is reduced.

Accordingly, it is a primary object of the present invention to provide a modulator integrated type refrigerant condenser which can prevent a reduction in the effective radiation area of the core by reducing the width of the dead space.

It is also an objective of the present invention to provide a modulator integrated type refrigerant condenser which has a modulator volume large enough to absorb variations in circulating refrigerant quantity.

SUMMARY OF THE INVENTION

To achieve these and other goals, a first preferred embodiment of the present invention provides a modulator integrated type refrigerant condenser comprising a core composed of a plurality of tubes extending in the width direction thereof and stacked in the height direction thereof, a roughly cylindrical header connected to an end part of the core in the width direction of the core which has a first inner space extending in the height direction of the core, and a modulator directly connected to the header in the width direction of the core, where the modulator has a second inner space extending in the same direction as the first inner space, and where the modulator includes a partition part for dividing the second inner space into a plurality of gas-liquid separation chambers in the thickness direction of the core and a plurality of communication passages for connecting the first inner space to the plurality of gas-liquid separation chambers.

In this way, the refrigerant in the gas-liquid two-phase state flowing out of the outlet composed of the plurality of tubes is collected once within the first inner space of the header, and then fed out through the communication passages into the plurality of gas-liquid separation chambers of the modulator. In this arrangement, gas refrigerant in a fine bubble state flowing out of the outlet of the plurality of tubes is collected once within the first inner space of the header, and turns into gas refrigerant in a large bubble state so that it exhibits buoyant effects and can easily be separated into gas refrigerant and liquid refrigerant within the plurality of the gas-liquid separation chambers of the modulator.

A second preferred embodiment of the present invention provides a modulator integrated type refrigerant condenser comprising a core having a condensing part for condensing and liquefying refrigerant by heat exchanging the refrigerant with a heat medium, and a supercooling part disposed in a position lower than that of the condensing part for supercooling refrigerant by heat exchanging the refrigerant with a heat medium, a header connected to an outlet of the condensing part at an end part of the core in the width direction of the core, where the header has a first inner space extending in the height direction of the core, and a modulator directly connected to the header in the width direction of the core and extending in the same direction as the first inner space, wherein the header includes a first partition part for dividing the first inner space at least into an upper side communication chamber which communicates with the outlet of the condensing part and a lower side communication chamber disposed in a position lower than that of the upper side communication chamber which communicates with the inlet of the supercooling part, where the modulator includes a second partition part for dividing the second inner space at least into a plurality of gas-liquid separation chambers in the width direction of the core, a first communication passage which connects the upper communication chamber with the plurality of gas-liquid separation chambers, and a second communication passage which connects the plurality of gas-liquid separation chambers and the lower side communication chamber.

In this way, the refrigerant in the gas-liquid two-phase state flowing out of the outlet of the condensing part is collected once within the upper side communication chamber of the header, and is then fed out through the first communication passage into the plurality of gas-liquid separation chambers of the modulator. In this arrangement, gas refrigerant in a fine bubble state flows out of the outlet of the condensing part, is collected once within the upper side communication chamber of the header, and turns into gas refrigerant in a large bubble state so that it exhibits buoyant effects and can easily be separated into gas refrigerant and liquid refrigerant within the plurality of gas-liquid separation chambers of the modulator.

Preferably, by providing the partition part dividing the second internal space of the modulator, the cross-section of the modulator is formed into a shape as if a plurality of roughly cylindrical pipe bodies were stacked up in the flow direction of a heat medium. Furthermore, since the header and the modulator are directly connected to each other, by providing the first and second communication passages, there is no need to provide joints such as pipes to connect the header and the modulator.

The modulator may be formed into a cross-sectional shape as if a plurality of roughly cylindrical pipe bodies were stacked up in the width direction of the core. Furthermore, a flat mounting part may be formed on the outside part of the header in the width direction of the core against the opposite part, and a flat mounted part may be formed to be mounted on this mounting part on the inside part of the modulator in the width direction of the core. Moreover, the header and the modulator may integrally be formed by extrusion processing.

Due to the above advantages, even if the modulator is enlarged to improve the gas-liquid separability, the width of the dead space which does not contribute to heat exchange can be made shorter in comparison with a modulator integrated type refrigerant condenser in which the header and the modulator are directly connected in the width direction of the core, or in comparison with a modulator separated type refrigerant condenser in which the refrigerant condenser and the modulator are separately and independently provided.

Furthermore, even if a large mounting space for the modulator integrated type refrigerant condenser cannot be provided, the present invention does not need to shorten the size of the core in the width direction thereof. Moreover, if the internal volume of the modulator, i.e., the cross-section of the plurality of gas-liquid separation chambers, is the same as that of a simple cylindrical modulator having no partition part, the width and radial size of the modulator can be shortened.

Thus, since the width of the modulator dead space which does not contribute to heat exchange can be reduced, a reduction in the effective radiation area of the core can be prevented, and the deterioration in heat radiation performance of the modulator integrated type refrigerant condenser can be prevented.

Also, by using the partition part dividing the second internal space of the modulator into the plurality of gas-liquid separation chamber as a reinforcing member for reinforcing the interior of the modulator, the strength of the modulator can be improved, and the wall thickness of the modulator can be reduced.

Furthermore, the feeding of the gas refrigerant in the bubble state from the modulator can be prevented without enlarging the modulator. Also, the feeding of the gas refrigerant in the bubble state from the modulator through the second communication chamber and the lower side communication chamber into the supercooling part can be prevented without enlarging the modulator.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PRESENTLY PREFERRED EXEMPLARY EMBODIMENTS preferred embodiments of a modulator integrated type refrigerant condenser according to the present invention will now be described in conjunction with the appended drawings.

Figure 1:
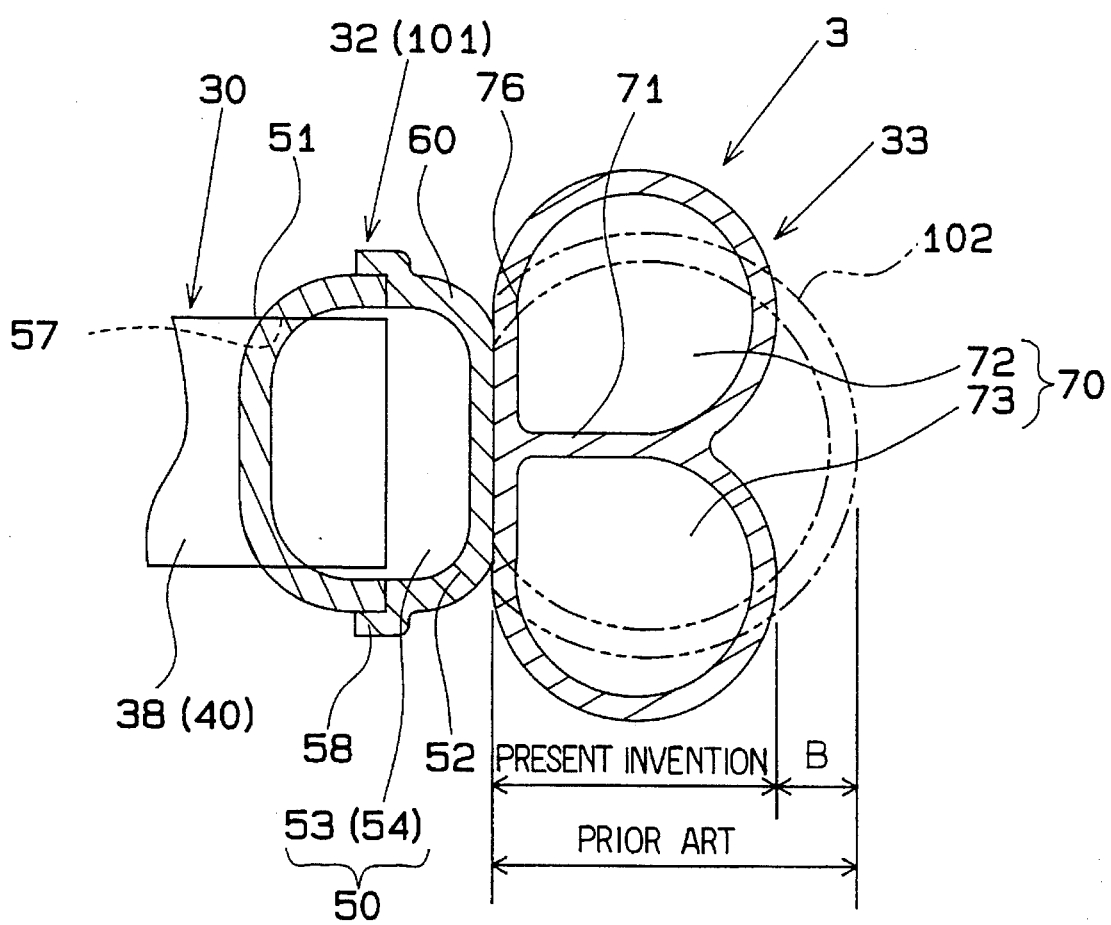
FIG. 1 is a cross-sectional view illustrating a right side header and modulator of a modulator integrated type refrigerant condenser according to a first preferred embodiment of the present invention.
Figure 2:
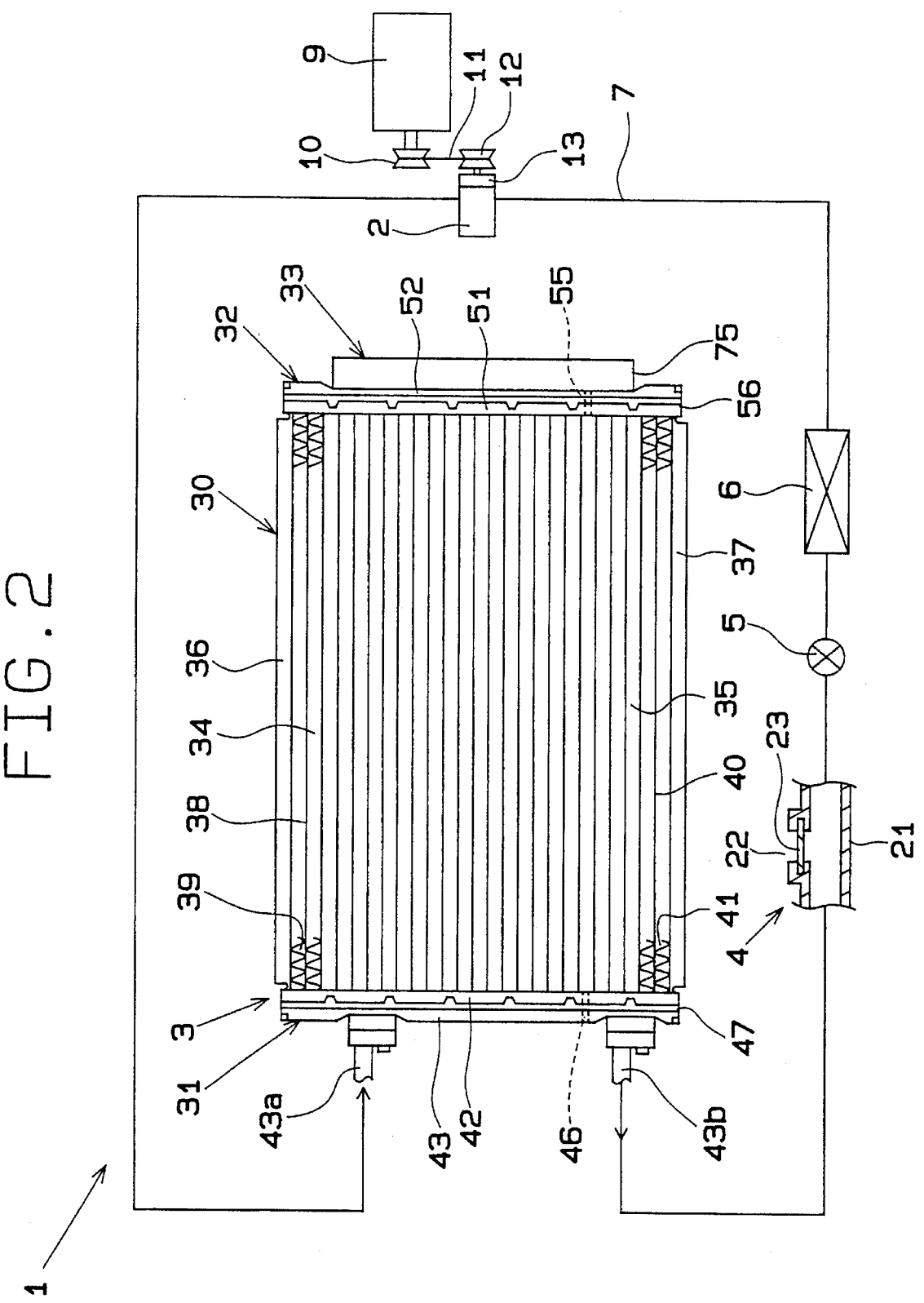
FIG. 2 is a view illustrating a refrigerating cycle of an automotive air conditioner according to the first embodiment of the present invention.
Figure 3:
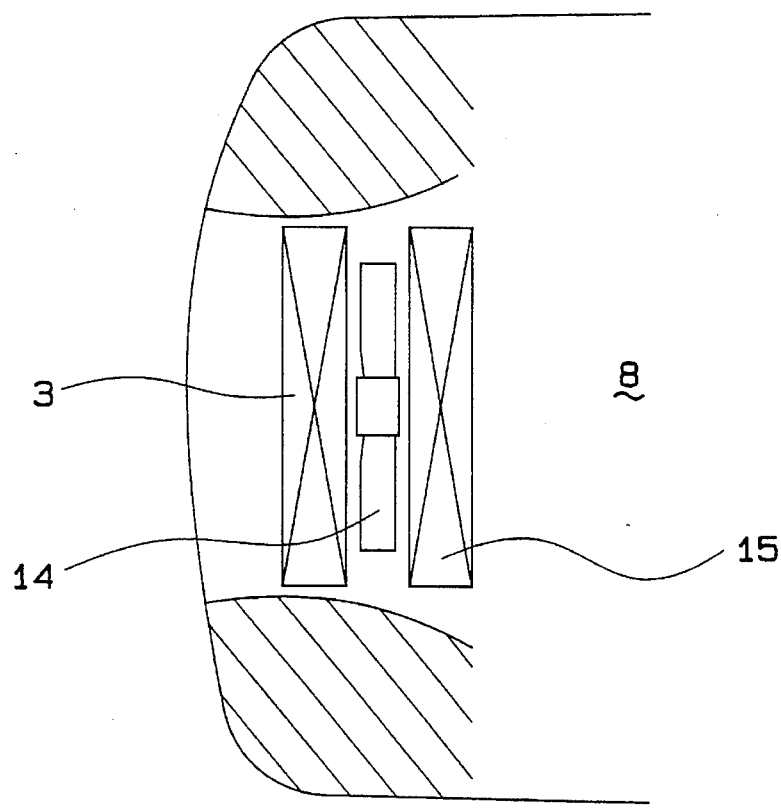
FIG. 3 is a top view illustrating a typical installation of a modulator integrated type refrigerant condenser according to the first embodiment of the present invention.
Figure 4:
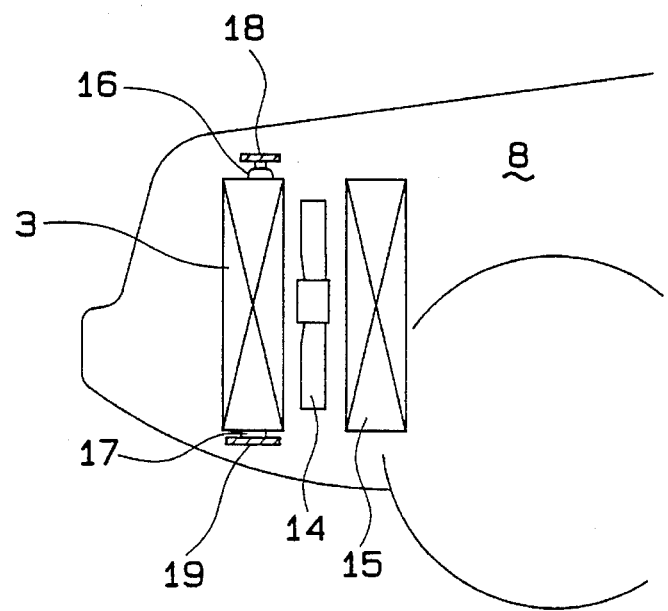
FIG. 4 is another cross-sectional view illustrating a typical installation of the modulator integrated type refrigerant condenser according to the first embodiment of the present invention.

FIGS. 1 to 9 illustrate a first preferred embodiment of the present invention. FIG. 1 illustrates the main part of the modulator integrated type refrigerant condenser, FIG. 2 illustrates the refrigerating cycle of an automotive air conditioner, and FIGS. 3 and 4 illustrate typical installations of the modulator integrated type refrigerant condenser when mounted on a vehicle.

Referring to FIG. 2, in a refrigerating cycle 1 of an automotive air conditioner, a refrigerant compressor 2, a modulator integrated type refrigerant condenser 3, a sight glass 4, an expansion valve 5 and a refrigerant evaporator 6 are serially connected through a refrigerant pipe 7 which is made of metal, rubber or the like. The refrigerant compressor 2 is connected to an engine 9 disposed within an engine compartment 8 (shown in FIGS. 3 and 4) of the vehicle through a pulley 10, a belt 11, a pulley 12 and an electromagnetic clutch 13. This refrigerant compressor 2 sucks gas refrigerant when the rotating power of the engine is transmitted thereto and then compresses the gas refrigerant and discharges the high-temperature, high-pressure gas refrigerant into the downstream portion of pipe 7.

The modulator integrated type refrigerant condenser 3 is connected between the discharge port of the refrigerant compressor 2 and the inlet of the expansion valve 5 through the sight glass 4. As shown in FIGS. 3 and 4, this modulator integrated type refrigerant condenser 3 typically is disposed together with a radiator 15 and a cooling fan 14 within the engine compartment 8 of the vehicle so that the modulator integrated type refrigerant condenser 3 can efficiently receive wind through a front vehicle grill (not shown) on the front side of the vehicle when the vehicle is running. Referring to FIG. 4, the modulator integrated type refrigerant condenser 3 is mounted on stays 18 and 19 by mounting brackets 16 and 17 respectively secured to the upper and lower parts thereof.

The sight glass 4 connected between the outlet of the modulator integrated type refrigerant condenser 3 and the inlet of the expansion valve 5 is a refrigerant condition observing device for observing the condition of the refrigerant circulating within the refrigerating cycle 1. This sight glass 4 is suspended from the refrigerant pipe 7 in some position within the engine compartment 8 of the vehicle, for example, where it is possible to observe easily the refrigerant condition.

Furthermore, the sight glass 4 is composed of a round pipe-like metal body 21 both ends of which are joined to the refrigerant pipe 7 by welding, fastening or another joining technique, and a deposited glass 23 fitted in an observation port 22 formed in the top of the metal body 21. Generally, when gas refrigerant containing bubbles is observed through the observation port 22, it means that the quantity of refrigerant in circulation is not sufficient, and when gas refrigerant containing no bubbles is observed through the observation port 22, the quantity of refrigerant in circulation is appropriate.

The expansion valve 5 connected between the outlet of the sight glass 4 and the inlet of the refrigerant evaporator 6 is a pressure reducing device for expanding the liquid refrigerant flowing therein by reducing the pressure thereof into gas-liquid two-phase refrigerant. In this embodiment, a thermostatic expansion valve which can automatically regulate the opening of the valve so that superheating of the refrigerant at the outlet of the refrigerant evaporator 6 is maintained at a specified value is used as the expansion valve 5. Instead of the expansion valve 5, another pressure reducing device such as a capillary tube or an orifice may also be used.

The refrigerant evaporator 6 connected between the outlet of the expansion valve 5 and the suction port of the refrigerant compressor 2 is an evaporating device for evaporating and gasifying the gas-liquid two-phase refrigerant flowing therein by heat exchanging the refrigerant with the air blown thereon by a blower (not shown).

Figure 5:
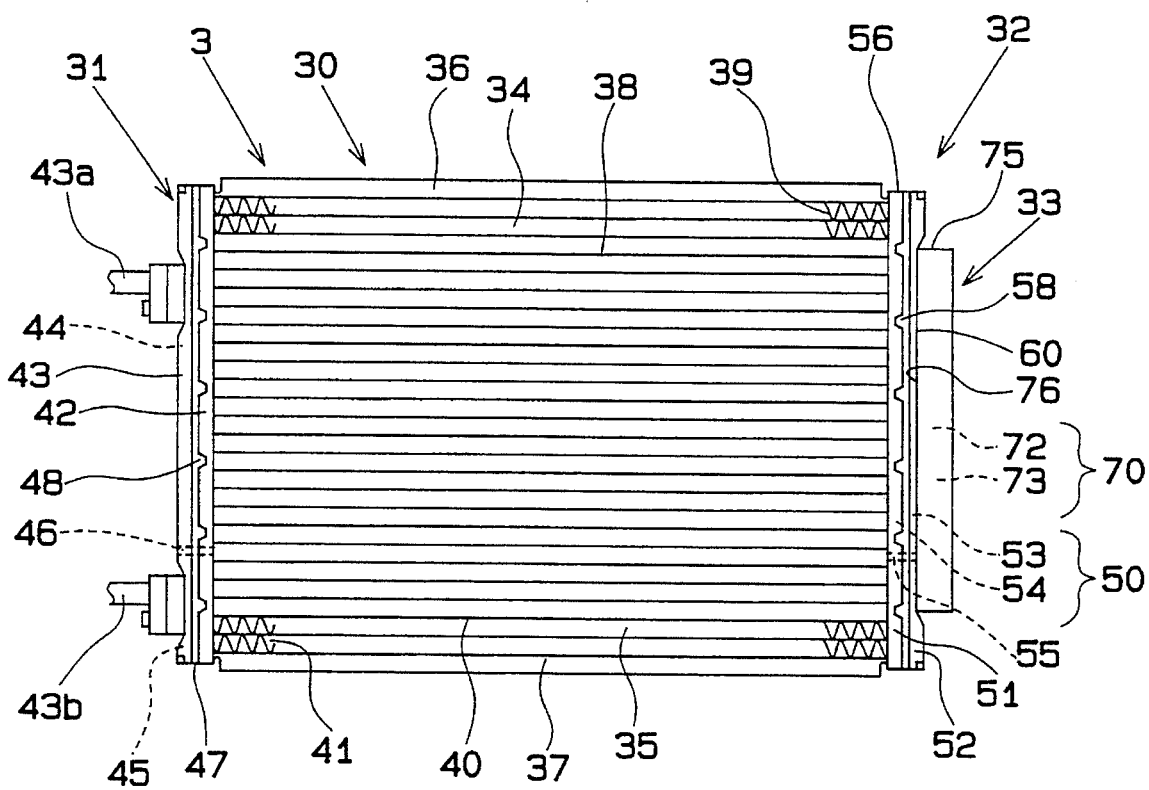
FIG. 5 is a front view illustrating the modulator integrated type refrigerant condenser according to the first embodiment of the present invention.

Next, the modulator integrated type refrigerant condenser 3 according to this embodiment will be described in detail with reference to FIGS. 1 and 5 to 9. As shown in FIG. 5, this modulator integrated type refrigerant condenser 3 is preferably 300 to 500 mm high (i.e., the top to bottom dimension or the up and down dimension) and 400 to 600 mm wide. The modulator integrated type refrigerant condenser 3 includes a core 30 for heat exchanging the refrigerant with the air, a left side header (i.e., an inlet/outlet side header) 31 disposed on the left end side of the core 30 along its width, a right side header (i.e., an intermediate header) 32 disposed on the right end side of the core 30 along its width, and a modulator 33 disposed on the core 30 opposite the right side header 32.

The core 30 is composed of a condensing part 34 and a supercooling part 35. Side plates 36 and 37 are respectively joined to the upper end part and lower end part of the core 30 by brazing or another joining technique for use in securing the mounting brackets 16 and 17 to their respective stays 18 and 19 on the vehicle side. The side plates 36 and 37 have a roughly U-shaped cross-section.

The condensing part 34 is composed of a plurality of condensing tubes 38 and corrugated fins 39 which are joined by brazing or another joining technique. This condensing part 34 is a condenser part which condenses and liquefies the high-temperature, high-pressure gas refrigerant flowing therein from the discharge port of the refrigerant compressor 2 by heat exchanging the refrigerant with the outdoor air as a heat exchange medium blown by the cooling fan 15.

The supercooling part 35 is positioned adjacent to and lower than the condensing part 34. This supercooling part 35 is composed of a plurality of supercooling tubes 40 and corrugated fins 41 which are joined by brazing or another joining technique. The supercooling part 35 is a subcooler part which supercools the high-temperature, high-pressure liquid refrigerant flowing therein from the right side header 32 by supercooling the refrigerant with outdoor air as a heat exchange medium blown by the cooling fan 15.

The plurality of condensing tubes 38 and the plurality of supercooling tubes 40 are horizontally disposed, forming refrigerant tube passages extending in the width direction of the core 30 which are flat and have an oval-shaped cross-section. A plurality of refrigerant passages (not shown)

within the plurality of condensing tubes 38 and plurality of supercooling tubes 40. The refrigerant flowing within the plurality of condensing tubes 38 flows horizontally from the left side header 31 to the right side header 32, while the refrigerant flowing within the plurality of supercooling tubes 40 flows horizontally from the right side header 32 to the left side header 31.

The plurality of condensing tubes 38 and the plurality of supercooling tubes 40 are horizontally disposed. Also, the number of the condensing tubes 38 is larger than the number of the supercooling tubes 40. It has been empirically determined that the number of the supercooling tubes 40 should preferably constitute 15 to 20% of the total number of all the tubes composing the core 30.

The plurality of corrugated fins 39 and 41 are respectively joined between the two condensing tubes 38 adjacent to each other and between the two supercooling tubes 40 adjacent to each other respectively by brazing or another joining technique. These corrugated fins 39 and 41 have a corrugated cross-sectional shape and are for improving the radiation efficiency of the refrigerant flowing through the refrigerant passages formed therewithin.

The left side header 31 is a roughly cylindrical pipe body having a third inner space (not shown) extending in the height direction of the core 30. The left side header 31 is composed of a header plate 42, connected to the left end part of the core 30, which has a roughly U-shaped cross-section, and a tongue plate 43, connected to the opening side of the header plate 42, which has an arc-shaped cross-section.

Within the left side header 31, i.e., within the third inner space, a roughly disc-shaped separator 46 is joined by brazing or another joining technique. This separator 46 is a separating device for separating the third inner space within the left side header 31 into an inlet side communication chamber 44 and an outlet side communication chamber 45. The inlet side communication chamber 44 communicates with the inlets of the plurality of condensing tubes 38, while the outlet side communication chamber 45 communicates with the outlets of the plurality of supercooling tubes 40. Disc shaped caps 47 are respectively fitted over the opening parts of the upper end part and lower end part of the left side header 31. These caps 47 are block the opening parts of the upper and lower end parts of the left side header 31.

Numerous through holes (not shown) are formed in the header plate 42. The inlet end parts of the plurality of condensing tubes 38 and the outlet end parts of the plurality of supercooling tubes 40 are plugged into the numerous through holes. A plurality of claw-like engagement parts 48 for fixedly engaging the outside surface of the edge of the opening side of the header plate 42 are partly formed on the edge of the opening side of the tongue plate 43 by crimping, as shown in FIG. 5. An inlet pipe 34*a* connected to the discharge port of the refrigerant compressor 2 and an outlet pipe 43*b* connected to the inlet of the sight glass 4 are connected to the back wall of the tongue plate 43.

Figure 6:
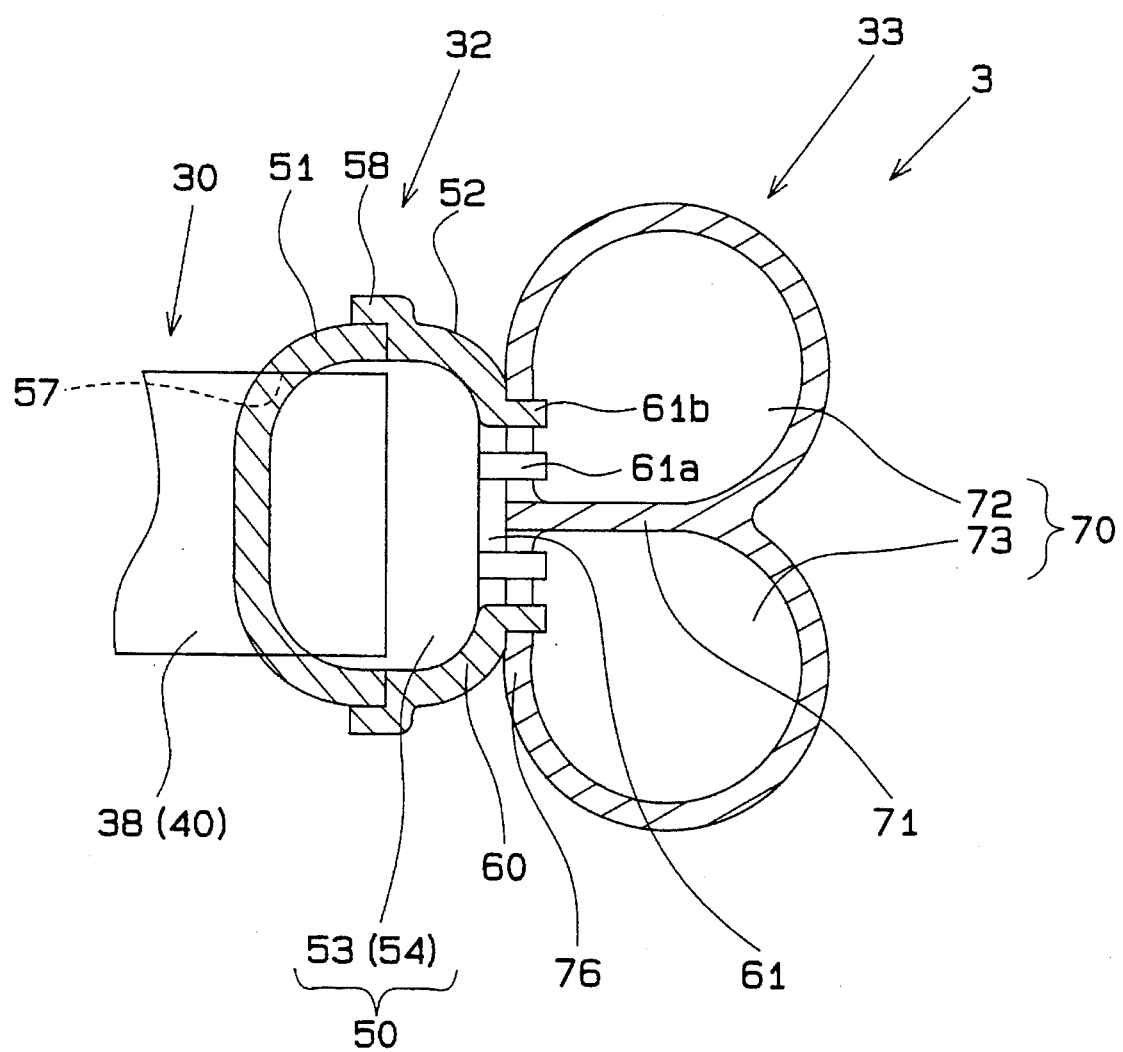
FIG. 6 is a cross-sectional view illustrating the right side header and modulator of the modulator integrated type refrigerant condenser according to the first embodiment of the present invention.

FIG. 6 illustrates the right side header 32 and the modulator 33. The right side header 32 is a simple, roughly cylindrical pipe body having a first inner space 50 extending in the height direction of the core 30. The right side header 32 is composed of a header plate 51 connected to the right end part of the core 30 which has a roughly U-shaped cross-section and a tongue plate 52 connected to the opening side of this header plate 51 which has an arc-shaped cross-section.

Within the right side header 32, i.e., within the first inner space 50, a separator 55 of rightly disc shaped is fixed within the right side header 32, i.e., within the first inner space 50, by brazing or another joining technique. This separator 55 separates the first inner space 50 into an upper communication chamber 53 and a lower communication chamber 54. The upper communication chamber 53 is connected to the outlets of the plurality of condensing tubes 38, while the lower communication chamber 54 is connected to the inlets of the plurality of supercooling tubes 40. Disc-like caps 56 are respectively fitted over the opening parts of the upper and lower end parts of the right side header 32. These disc-like caps 56 block the opening parts of the upper end part and lower end part of the right side header 32 respectively.

Figure 7:
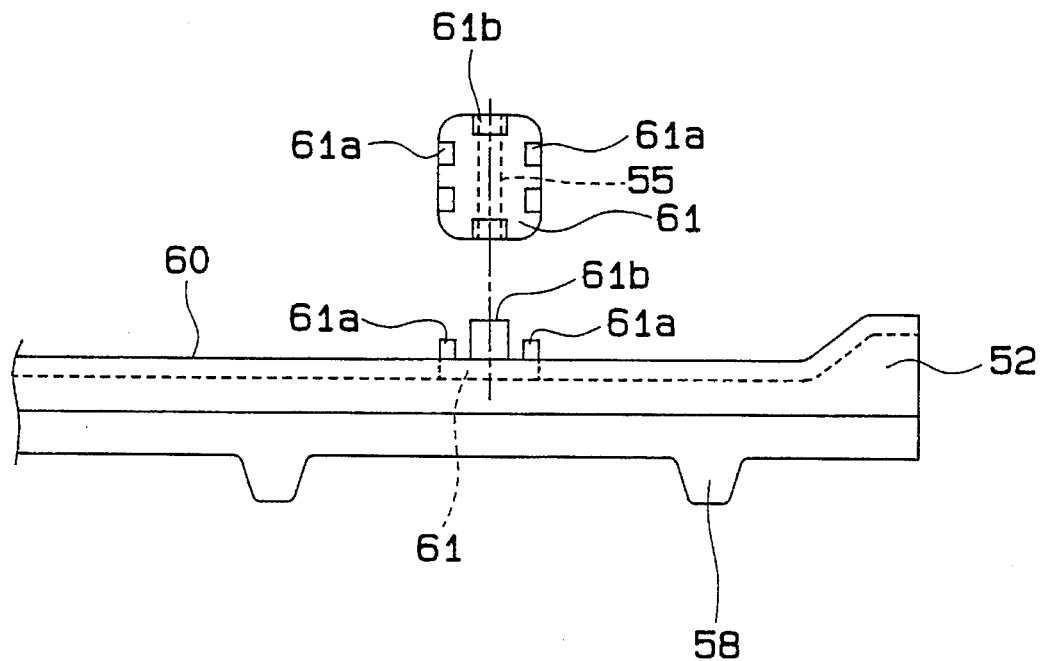
FIG. 7 is a front view illustrating a tongue plate according to the first embodiment of the present invention.
Figure 9:
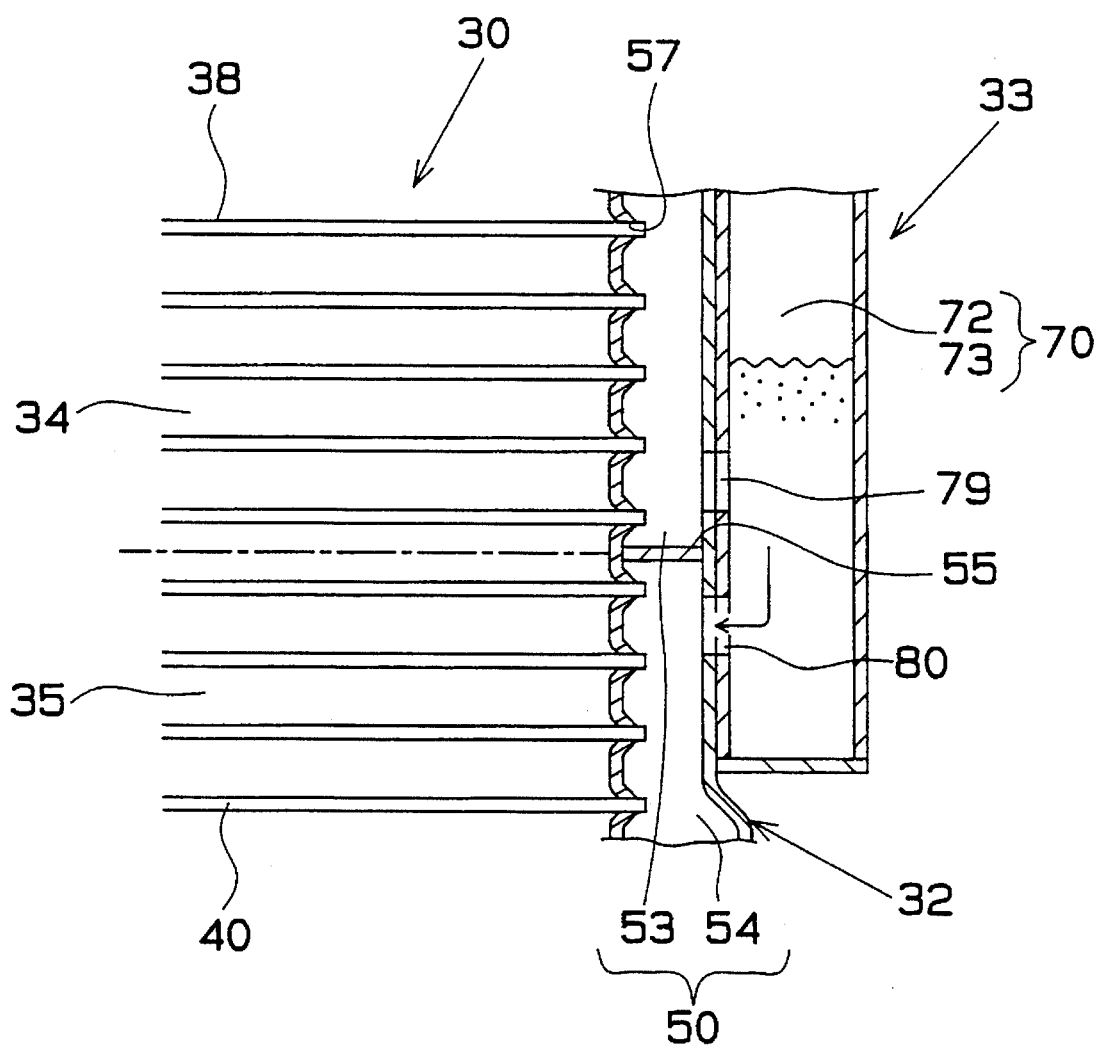
FIG. 9 is a view illustrating the operation of the modulator according to the first embodiment of the present invention.

As shown in FIG. 9, numerous through holes 57 are formed in the header plate 51. The inlet end parts of plurality of condensing tubes 38 and the outlet end parts of plurality of supercooling tubes 40 are plugged into the numerous through holes 57. A plurality of claw-like engagement parts 58 for fixedly engaging the outside surface of the edge of the opening side of the header plate 51 are partially formed on the edge of the opening side of the tongue plate 52 by crimping, as shown in FIG. 7.

A flat plate shaped flat part 60 for mounting the modulator 33 is formed on a part of the outside part of the right side header 32 in the width direction of the core 30, i.e., on a part of the back wall of the tongue plate 52. Roughly square shaped through holes 61 for connecting the first inner space 50 of the right side header 32 with the second inner space 70 of the modulator 33 are made in the upper and lower part of this flat part 60 with respect to the separator 55. Four ribs (engagement pieces) 61*a* for fixedly engaging the modulator 3 and two ribs (engagement pieces) 61*b* are folded from the circumference of the through hole 61 to the side of the modulator 33. The four ribs 61*a* are shorter than the two ribs 61*b* in the size of projection to the side of the modulator 33.

Figure 8:
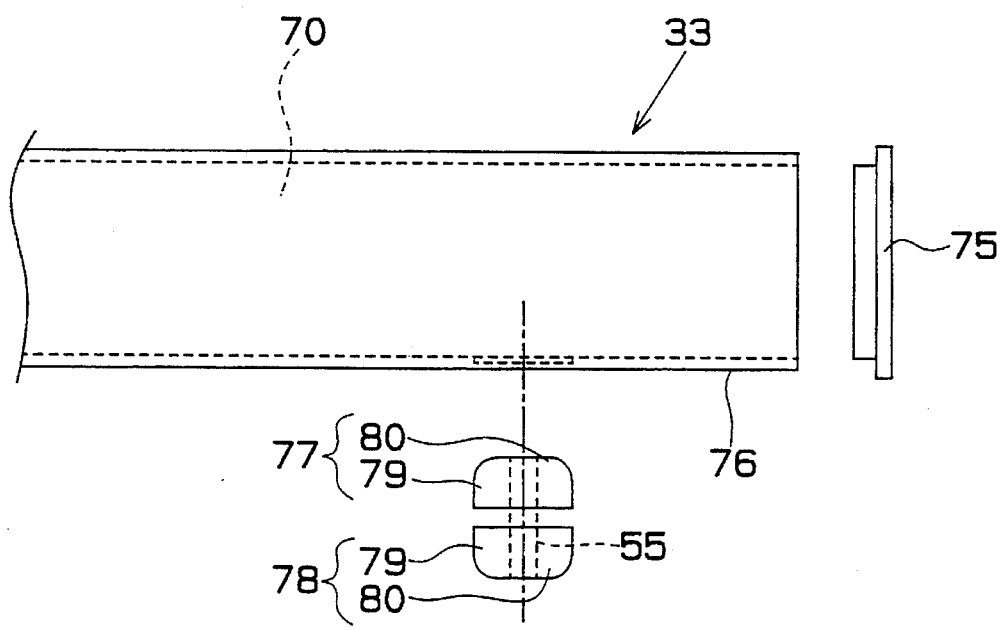
FIG. 8 is a front view illustrating the modulator according to the first embodiment of the present invention.

FIG. 8 illustrates a part of the modulator 33. This modulator 33 has a vertically extending second inner space 70 and is directly connected to the right side header 32 in the width direction of the core 30. The modulator 33 has a cross-sectional shape as if two roughly cylindrical pipe bodies were joined together in the thickness direction of the core 30 (i.e., in the flow direction of a heat medium such as outdoor air). A partition part 71 is formed within the modulator 33, i.e., within the second inner space 70. This partition part 71 separates the second inner space 70 of the modulator 33 into two gas-liquid separation chambers 72 and 73.

The two gas-liquid separation chambers 72 and 73 are roughly column-shaped and have a roughly circular cross-section. These chambers separate the refrigerant flowing therein from the upper side communication chamber 53 of the right side header 32 into gas refrigerant and liquid refrigerant and send out only the liquid refrigerant into the lower side communication chamber of the right side header 32. Roughly disc-shaped caps 75 are respectively fitted over the opening parts of the upper and lower end parts of the modulator 33. These caps 75 block the opening parts of the upper end part and lower end part of the modulator 33 respectively.

A flat plate-shaped flat part 76 as a part to be mounted on the flat part 60 of the header plate 51 is formed on the inside part of the modulator 33 in the width direction of the core 30, i.e., on the side wall of the modulator 33 on the core 30, is formed. Two roughly square through holes 77 and 78 divided by the partition part 71 into two parts in the flow direction of the outdoor air are formed in place of this flat part 76 in opposition to the separator 55. These two through holes 77 and 78 are connected to the two gas-liquid separation chambers 72 and 73 respectively.

The upper side parts of the two through holes 77 and 78 are used as two refrigerant inlet passages 79, while the lower side parts of the two through holes 77 and 78 are used as two refrigerant outlet passages 80. The two refrigerant inlet passages 79 are communication passages for connecting the upper side communication chamber 53 with the two gas-liquid separation chambers 72 and 73, and the two refrigerant outlet passages are communication passages for connecting the two gas-liquid separation chambers 72 and 73 with the lower side communication chamber 54.

A method of assembling a modulator integrated type refrigerant condenser 3 according to this embodiment will now be described with reference to FIGS. 1 and 5 to 8.

In this embodiment, a brazing sheet made of aluminum alloy, or any other metal having high corrosion resistance and high heat conductivity, which is clad on both sides with a brazing material is used for each part of the header plate 42 and tongue plate 43 of the left-side header 31, the header plate 51 and tongue plate 52 of the right side header 32, the modulator 33, the side plates 36 and 37, the plurality of condensing tubes 38, the plurality of supercooling tubes 40, the plurality of corrugated fins 39 and 41 and the caps 47, 56 and 75.

The modulator 33, the plurality of condensing tubes 38 and the plurality of supercooling tubes 40 are made of a flat plate-like brazing sheet extruded into the respective specified shapes. The header plate 42 and tongue plate 43 of the left side header 31, the header plate 51 and tongue plate 52 of the right side header 32 and other parts are made of a flat plate-like brazing sheet press worked into the respective specified shapes.

The supercooling part 35 is formed on one side plate 37 by alternatingly stacking up the plurality of corrugated fins 41 and the plurality of supercooling tubes 40. Then, the condensing part 34 is formed on the supercooling part 35 by alternatingly stacking up the plurality of corrugated fins 39 and the plurality of condensing tubes 38. Furthermore, the other side plate 36 is stacked on the condensing part 34.

Then, the left end parts of the plurality of condensing tubes 38 and the plurality of supercooling tubes 40 are plugged into respective through holes in the header plate 42, and the right end parts thereof are plugged into respective through holes in the header plate 51. In this process, in order to hold the shape of the core 30, a wire (not shown) or other jig is used to tighten both the side plates 36 and 37.

Then, the separator 46 is set in the specified position, the opening side of the header plate 42 and the opening side of the tongue plate 43 are aligned with one another, and the plurality of claw-like engagement parts 48 partially formed on the edge of the opening side of the tongue plate 43 are crimped. By fixedly engaging these claw-like engagement parts 48 with the outside surface of the edge on the opening side of the header plate 42, the cylindrical left side header 31 is temporarily assembled on the left end part of the core 30.

As shown in FIG. 7, the ribs 61a and 61b are folded from the circumference of the through hole 61 opened at the flat plate-like flat part 60 formed on the back wall of the tongue plate 52 on the side of the modulator 33. These ribs 61a and 61b are, as shown in FIG. 8, plugged into the two through holes 77 and 78 opened at the flat plate-like flat part 76 formed on the roughly cylindrical modulator 33 on the side wall on the side of the core 30, and then crimped.

In this condition, as shown in FIG. 6, the four ribs 61a respectively fixedly engage the upper side circumference and lower side circumference of the two through holes 77 and 78 in the modulator 33, while the two ribs 61b respectively fixedly engage the front side circumference and rear side circumference of the two through holes 77 and 78 in the modulator 33 respectively. As a result, the flat part 60 and the flat part 76 are assembled close together.

Then, the separator 55 is set in the specified position, the opening side of the header plate 51 and the opening side of the tongue plate 52 are aligned with one another, and the plurality of claw-like engagement parts 58 partly formed on the edge of the opening side of the tongue plate 52 are crimped. By fixedly engaging these claw-like engagement parts 58 with the outside surface of the edge on the opening side of the header plate 51, the cylindrical right side header 32 and the modulator 33 are temporarily assembled on the right end part of the core 30.

Here, the one through hole 61 and the two through holes 77 and 78 made in the flat part 60 of the tongue plate 52 and the two through holes 77 and 78 made in the modulator 33 are respectively separated in their upper and lower directions by the separator 55 (indicated by broken lines in FIGS. 7 and 8) within the right side header 32 when the modulator 33, the right side header 32 and the separator 44 are installed.

Accordingly, the upper side parts of the two through holes 77 and 78 may be considered as the two refrigerant inlet passages 79 for communicating the upper side communication chamber 53 with the two gas-liquid separation chambers 72 and 73. On the other hand, the lower side parts of the two through holes 77 and 78 may be considered as the two refrigerant outlet passages 80 for communicating the two gas-liquid separation chambers 72 and 73 with the lower side communication chamber 54.

Next, the opening parts formed on the upper and lower end parts of the left side header 31, right side header 32 and modulator 33 are respectively closed with the caps 47, 56 and 75 respectively and then secured thereto with vacuum integrated brazing or some other welding technique. Then, the part between the flat part 60 of the tongue plate 52 and the flat part 76 of the modulator 33 and other parts are joined. As a result, as shown in FIGS. 1, 5 and 6, the manufacture of the modulator integrated type refrigerant condenser 3 is completed.

Now, the mode of operation of this embodiment will briefly be described with reference to FIGS. 1 to 9. Here, FIG. 9 is an operational view of a main part of the modulator integrated type refrigerant condenser 3.

When operation of the automotive air conditioner starts, the electromagnetic clutch 13 is energized and the refrigerant compressor 2 is rotatably driven by the engine 9 through the pulley 10, the belt 11, the pulley 12 and the electromagnetic clutch 13. The high-temperature, high-pressure refrigerant compressed within the refrigerant compressor 2 and discharged therefrom flows through the inlet pipe 43a into the inlet side communication chamber 44 of the left side header 31. The gas refrigerant flowing into the inlet side communication chamber 44 is distributed therewithin into the plurality of condensing tubes 38.

While flowing through the plurality of condensing tubes 38, the gas refrigerant is heat exchanged with the outdoor air through the corrugated fins 39 and mostly condensed into liquid refrigerant leaving a part thereof in the gas phase. The refrigerant in the gas-liquid two-phase state flows from the plurality of condensing tubes 38 into the upper side communication chamber 53 of the right side header 32.

The refrigerant in the gas-liquid two-phase state flowing into the upper side communication chamber 53 is collected once and then flows through the two refrigerant inlet passages 79 into the two gas-liquid separation chambers 72 and 73 of the modulator. In this arrangement, gas refrigerant in a fine bubble state flowing out of the downstream end of the plurality of condensing tubes 38 is collected within the upper side communication chamber 53 and turned into gas refrigerant in a large bubble state. Accordingly, the gas refrigerant exhibits buoyant effects.

In other words, since the refrigerant inlet passage 79 opens at the lower part of the upper side communication chamber 53 and the refrigerant inlet passage 79 and the refrigerant outlet passage 80 are comparatively close together, when the refrigerant in the gas-liquid two-phase state flows through the two refrigerant inlet passages 79, the two gas-liquid separation chambers 72 and 73 and the two refrigerant outlet passages 80 in that order, the liquid refrigerant having larger specific gravity shifts to the back wall side part of the modulator 33 and the gas refrigerant in the bubble state having a smaller specific gravity shifts to the modulator 33 on the side of the core 30.

Accordingly, since the refrigerant in the gas-liquid two-phase state is efficiently separated into gas refrigerant and liquid refrigerant within the modulator 33, the gas refrigerant which could not completely be condensed collects at the upper part of the modulator 33 and the liquid refrigerant pools at the lower part thereof. Therefore, if the refrigerating cycle 1 is filled with refrigerant in a quantity sufficient to form a gas-liquid interface within the modulator 33, only the liquid refrigerant which has no subcooling flows from the two refrigerant outlet passages 80 located at the lower part of the modulator 33 into the lower side communication chamber 54. The refrigerant flowing into the lower side communication chamber 54 is distributed to the plurality of supercooling tubes 40.

The refrigerant distributed into the plurality of supercooling tubes 40 are heat exchanged with the outdoor air through the corrugated fins 41 and supercooled into liquid refrigerant having subcooling while flowing through these supercooling tubes 40, turned into refrigerant having subcooling, and then flows into the outlet side communication chamber 45 of the left side header 31.

The liquid refrigerant flowing into the outlet side communication chamber 45 flows through the sight glass 4 into the expansion valve 5. Incidentally, since the expansion valve 5 is supplied with liquid refrigerant in single phase containing no gas refrigerant, there is no possibility that the quantity of refrigerant flowing into the expansion valve 5 is reduced. As a result, a sufficient quantity of atomized refrigerant enters the refrigerant evaporator 6 and therefore the deterioration in the refrigerating ability of the automotive air conditioner can be prevented.

As described above, in the refrigerating cycle 1 of the automotive air conditioner, the two refrigerant inlet passages 79 open at the lower side of the upper communication chamber 53, i.e., the lower side of the modulator 33. Due to this arrangement, even if the quantity of circulating refrigerant is large as is the case with high-speed operation of the refrigerant compressor 2, the gas-liquid interface can be formed within the modulator 33 without excessively enlarging the cross-section of the modulator 33. Furthermore, since the gas-liquid separability within the two gas-liquid separation chambers 72 and 73 is high, the gas refrigerant collects at the upper part of the two gas-liquid separation chambers 72 and 73 and the liquid refrigerant pools at the lower part thereof.

Therefore, the gas refrigerant in the bubble state is not driven from the two refrigerant outlet passages 80 of the modulator 33 to the plurality of supercooling tubes 40, the sight glass 4 and the expansion valve 5, whereby the supercooling part 35 can effectively be operated and the occurrence of the refrigerant flowing sound within the expansion valve 5 can be prevented. Furthermore, the modulator integrated type refrigerant condenser 3 having a modulator volume which can absorb variations in the refrigerant circulating quantity can be obtained without excessively enlarging the cross-section of the modulator 33.

Additionally in this embodiment, since the sight glass 4 is connected on the downstream side of the supercooling part 35, there is no need to ensure the gas-liquid separability within the modulator 33. Therefore, the internal volume of the modulator 33, i.e., the cross-section of the second internal space 70, can only be as much as is necessary to allow for the refrigerant variation and refrigerant leakage due to the load variation of the refrigerating cycle 1.

Furthermore, since the supercooling part 35 is provided on the downstream side of the second internal space 70 (the two gas-liquid separation chambers 72 and 73) of the modulator 33, even if the gas-liquid separation within the two gas-liquid separation chambers 72 and 73 is not complete, the gas refrigerant in the bubble state can become completely extinct. Thus, the internal volume of the modulator 33, i.e., the cross-section of the two gas-liquid separation chambers, can be reduced, and the effective radiation area of the core 30 having the condensing part 34 and the supercooling part 35 can be enlarged in comparison with prior art systems.

Moreover, in the modulator integrated type refrigerant condenser 3 according to this embodiment, the roughly cylindrical modulator 33 is directly and adjacently connected to the roughly cylindrical right side header 32 connected to the core 30 in the width direction thereof. Due to this arrangement, by only making the through hole 61 in the flat part 60 and two through holes 77 and 78 in the flat part 76, the refrigerant inlet passage 79 and refrigerant outlet passage 80 which communicates between the right side header 32 and the modulator 33 can be provided. As a result, there is no need to provide joints such as pipes for connecting the right side header 32 and the modulator 33.

In the above arrangement, even if the radial size of the modulator 33 is enlarged and thereby the inner volume of the modulator 33 is increased to improve the gas-liquid separability, the width of a dead space which does not contribute to the heat exchange of the refrigerant with a heat exchange medium such as the outdoor air can be reduced.

Furthermore, if the internal volume of the modulator 33, i.e., the cross-section of the two gas-liquid separation chambers 72 and. 73, is supposed to be the same as that of one simply cylindrical modulator 102 (shown by the chained, double-dotted line in FIG. 1) adjacently connected to an outlet side header 101 (shown by the chained, double-dotted line in FIG. 1) in the width direction thereof, the width of the modulator 33 can be reduced by as much as B and the radial size of the modulator 102 can also be reduced. Besides, even if sufficient mounting space for the modulator integrated type condenser 3 can not be obtained, since the width of the dead space can be reduced, there is no need to reduce the width of the core 30.

As a result, since the dead space does not contribute to the heat exchange, the reduction in the effective radiation area of the core 30 can be prevented, which is beneficial for the modulator integrated type refrigerant condenser 3. Therefore, since the deterioration in the radiation performance of the modulator integrated type refrigerant condenser 3 can be prevented, deterioration in the refrigerating ability of the refrigerating cycle 1 can be prevented.

In addition, by providing the partition part 71 which divides the inside of the modulator into two parts, the modulator 33 is formed with a cross-sectional shape as if two roughly cylindrical pipe bodies were stacked up in the flow direction of the outdoor air, and the partition part 71 is used as a reinforcing member for reinforcing the inside of the modulator 33. As a result, the strength of the modulator 33 can be increased, and therefore the wall thickness of the modulator 33 can be reduced.

Furthermore, only by making the two through holes 77 and 78 in the module 33 by press working or use of a similar technique, the two refrigerant inlet passages 79 and the two refrigerant outlet passages 80 can be formed. Consequently, since the number of parts can be reduced, the ease of assembling the device can be improved, and therefore an improvement in the productivity of the modulator integrated type refrigerant condenser 3 can be achieved along with a reduction of the product cost.

Figure 10:
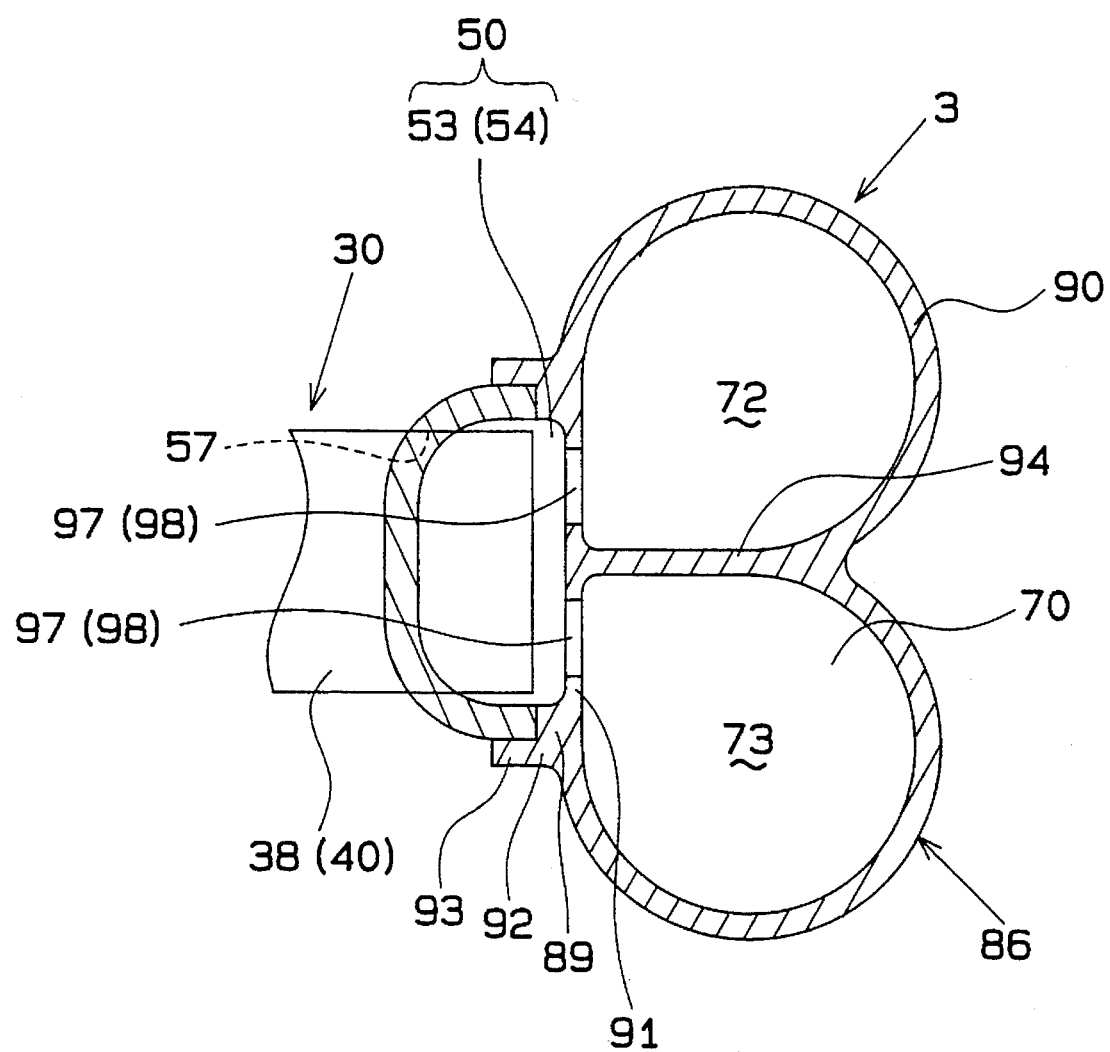
FIG. 10 is a cross-sectional view illustrating a right side header and modulator of a modulator integrated type refrigerant condenser according to a second embodiment of the present invention.

FIG. 10 illustrates a second embodiment according to the present invention, particularly the right side header and modulator of the modulator integrated type refrigerant condenser. In the modulator integrated type refrigerant condenser 3 according to this embodiment, the header plate 51 (not shown in this Fig.) includes a roughly cylindrical body 86 on the header plate 51 to which the outlet of the plurality of condensing tubes 38 and the inlet of the plurality of supercooling tubes 40 are connected.

The roughly cylindrical body 86 is integrally formed by extruding aluminum alloy or other material which has high corrosion resistance. This roughly cylindrical body 86 is composed of a tongue plate part 89 provided on the side of the core 30 and a modulator part 90 provided on the side of the header plate 57 opposite the side of the core.

The tongue plate part 89 installed on the opening side of the header plate 51 includes a partition wall (a third partition part) 91 dividing the first inner space 50 of the right side header 32 from the second inner space 70 of the modulator part 90, and a skirt-like part 92 whose front and read end parts extends in the flow direction of the outdoor. A plurality of claw-like engagement parts 93 which fixedly engage the outside surface of the edges of the opening side of the header plate 51 are partially formed on the edges of the skirt-like part 92.

The modulator part 90 has a cross-sectional shape as if two roughly cylindrical pipe bodies were stacked up in the flow direction of the outdoor air and provided with a partition part 94 for dividing the above partition wall 91 and the second internal space 70 into two gas-liquid separation chambers 72 and 73.

Two refrigerant inlets 97 for guiding the refrigerant from the upper side communication chamber 53 into the two gas-liquid separation chambers 72 and 73 and two refrigerant outlets (98) for guiding the refrigerant from the two gas-liquid separation chambers 72 and 73 into the lower side communication chamber 54 are respectively formed on the partition wall 91.

In this embodiment, the present invention is incorporated into the refrigerating cycle 1 of the automotive air conditioner. The present invention, however, may be incorporated into the refrigerating cycle of an air conditioner for rolling stock, seacraft or aircraft. The present invention may also be incorporated into the refrigerating cycle of a stationary air conditioner for household or industrial use. Particularly, the present invention can most suitably be incorporated into the refrigerating cycle of an air conditioner for a vehicle in which the refrigerant circulating quantity within the refrigerating cycle is subject to variation.

In this embodiment, although outdoor air blown by the cooling fan 15 is used as a heat medium, gas such as indoor air or liquid such as cooling water may be used instead. Furthermore, in this embodiment, though the supercooling part 35 is provided within the core 30, the supercooling part 35 may not be provided within the core 30. Moreover, for the refrigerant flow within the condensing part 34 and the supercooling part 35, the number of turns may be increased or decreased by eliminating the separators 46 and 55 or by increasing the number thereof to be more than two, on condition that the inlet of the modulator 33 should be provided on the side of the outlet of the condensing part 34. Also, a drier may be provided within the modulator 33.

In this embodiment, the cross-section of the modulator 33 is shaped as if two roughly cylindrical pipe bodies were stacked up in the flow direction of the outdoor air. Instead of this, the cross-section of the modulator 33 may be shaped as if three or more roughly cylindrical pipe bodies were stacked up in the flow direction of the outdoor air. In this case, however, the number of the gas-liquid separation chambers should be the same as the number of roughly cylindrical pipe bodies, and the number of the partition parts or the number of the second partition parts, the number of communication passages or the number of first communication passages or the number of second communication passages should also be two or more.

In this embodiment, though the two refrigerant inlet passages 79 and the two refrigerant outlet passages 80 from the two through holes 77 and 78 are formed by the existence of the separator 55, a plurality of refrigerant inlet passages (the first communication passages) and a plurality of refrigerant outlet passages (the second communication passages) may separately and independently be opened instead. Also in this embodiment, though the heat exchanger of corrugated fin tube type is used, a heat exchanger of plate fin tube type may be used instead.

In addition, the modulator integrated type refrigerant condenser 3 may be installed in a place other than the engine room 8 and the radiator 14, such as within a duct of an air conditioner.

Figure 11:
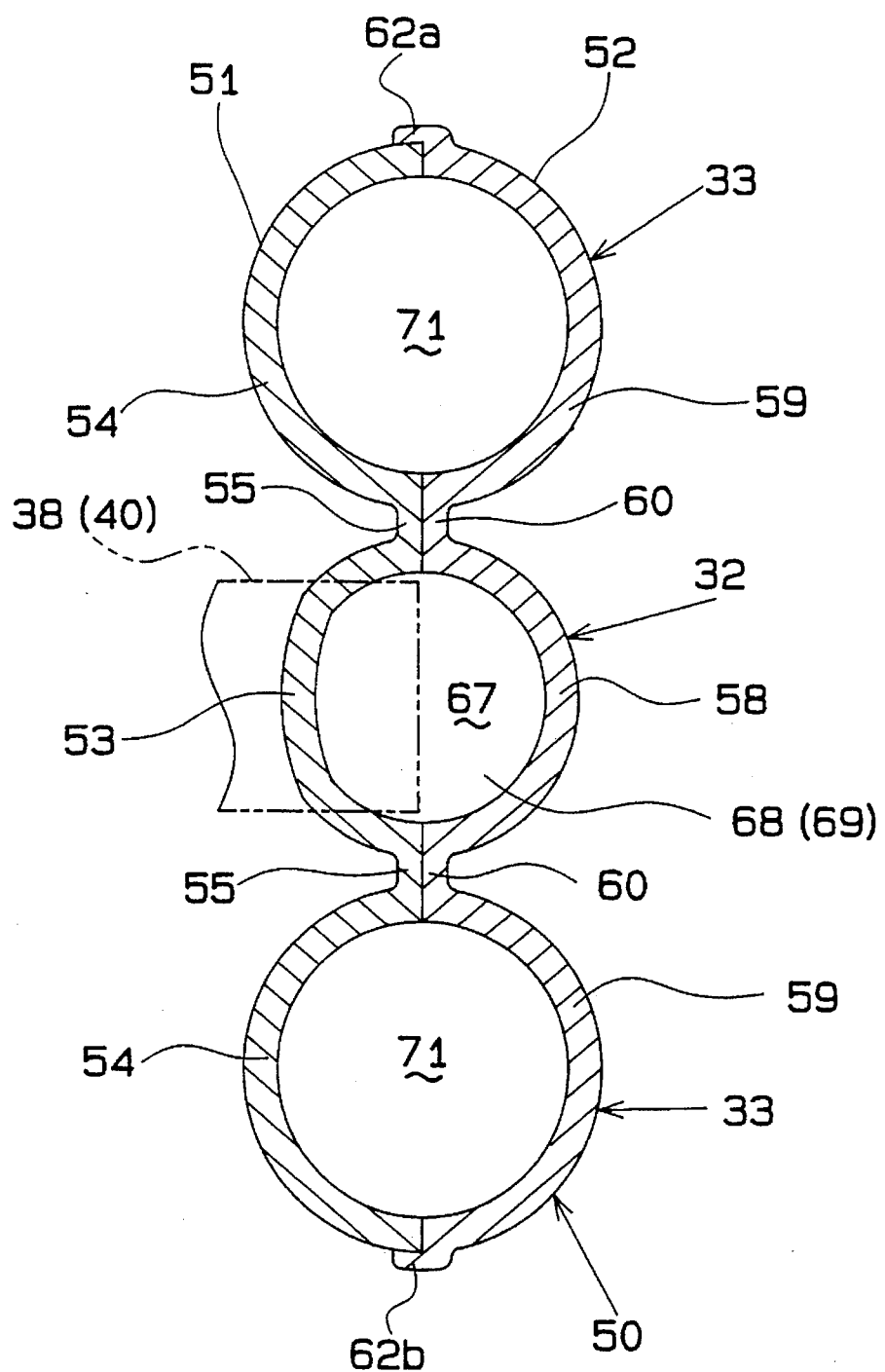
FIG. 11 is a cross-sectional view of a modulator according to a third embodiment of the present invention.

FIG. 11 illustrates the third embodiment according to the present invention, particularly the peripheral structure of the right side header of the modulator integrated type refrigerant condenser. In this embodiment, by sticking the respective end edges of the opening side of a pair of molded plates 51 and 52 to each other, the right side header 32 and modulator 33 are integrally formed.

Specifically, a first bulged part 53 whose cross-section is of semi-cylindrical shape is formed on the central part of the one molded plate 51. Two second bulged parts 54 which are larger in diameter than the first bulged part 53 and which have semi-cylindrical cross-sections are formed on the front and rear sides of this first bulged part 53 in the thickness direction of the core 30. Two connection parts 55 connecting the first bulged part 53 and the respective second bulged parts 54 are formed between the first bulged part 53 and the two second bulged parts 54.

On the other hand, the first bulged part 58 whose cross-section is of semi-cylindrical shape is formed on the central part of the other molded plates 52. Two second bulged parts 59 which are larger in diameter than the first bulged part 58 and which have semi-cylindrical cross-sections are formed on the front and rear sides of this first bulged part 58 in the thickness direction of the core 30. A flange-like engagement part 62a which is to be coupled with the outer peripheral surface of the front end edge on the opening side of the front side second bulged part 54 of the mating molded plate 51 is formed on the front end edge on the opening side of the front side second bulged part 59. On the other hand, a flange-like engagement part 62b which is to be coupled with the outer peripheral surface of the rear end edge on the opening side of the rear side second bulged part 54 of the mating molded plate 51 is formed on the rear end edge on the opening side of the rear side second bulged part 59.

Two connection parts 60 connecting the first bulged part 58 and the respective second bulged parts 59 are formed between the first bulged part 58 and the two second bulged parts 59. The right side header 32 is formed with the first bulged parts 53 and 58, and the modulator 33 is formed with the respective two second bulged parts 54 and 59 by sticking the respective end edges of the opening side of the pair of molded plates 51 and 52 to each other.

Large parts of the right side header 32 and the modulator 33 have the cross-section shown in FIG. 11; however, inlet and outlet passages similar to those in the previous embodiments may be provided by forming recesses on one or both of connection parts 55 and 60 to form passages connecting the interior 67 of the right side header 32 with the interior 71 of the modulator 33.

In this embodiment, assuming that the internal volume of the modulator 33, i.e., the cross-section of the two second internal spaces (gas-liquid separation chambers) 71, are the same as that of the modulator 33 according to the first embodiment, the width of the modulator 33 can be reduced and the radial size of the modulator 33 can also be reduced. As a result, the width of the dead space which does not contribute to the heat exchange of the refrigerant with the outdoor air can further be reduced in comparison with the first embodiment.

Figure 12:
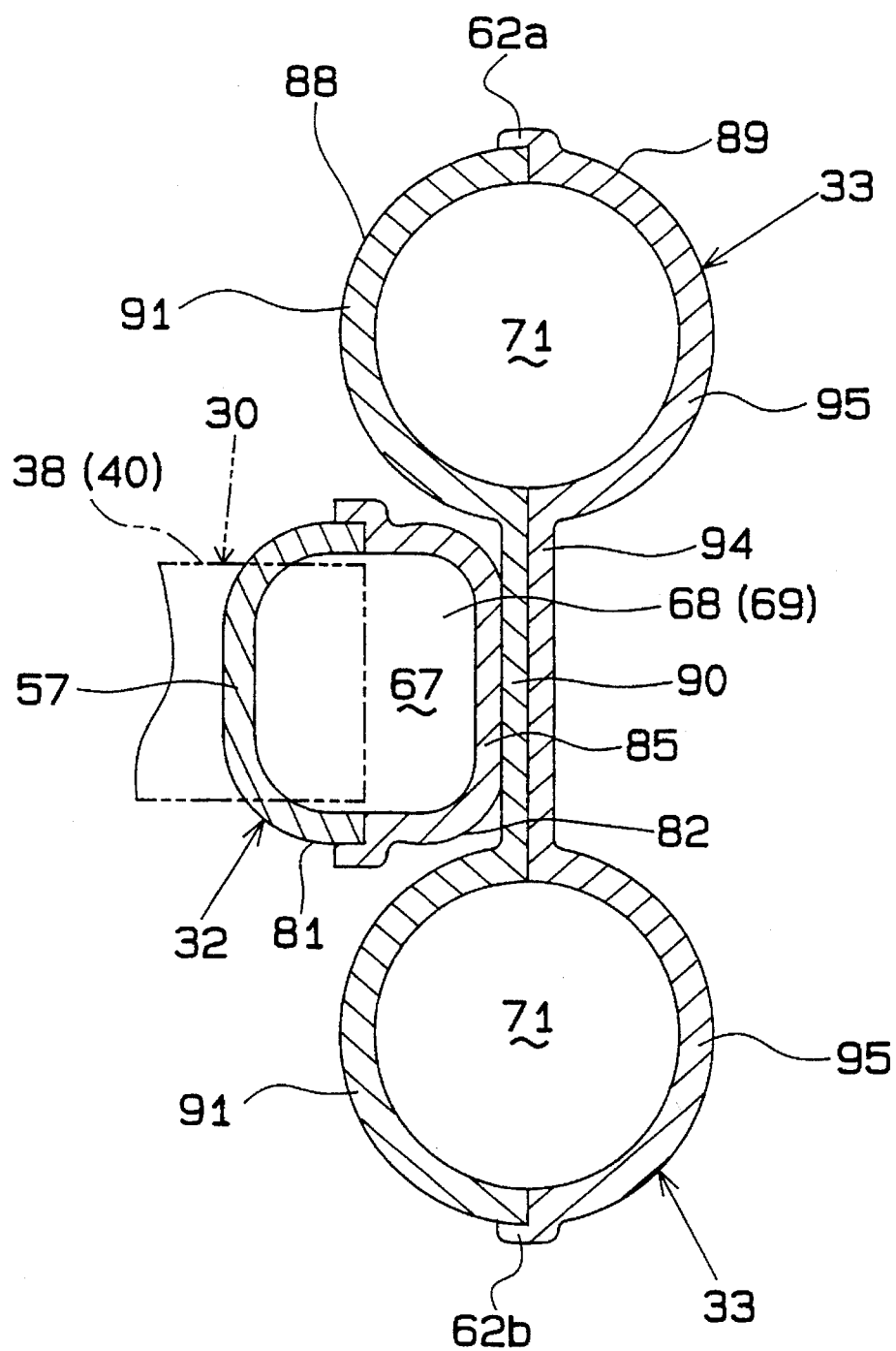
FIG. 12 is cross-sectional view of a modulator according to a fourth embodiment of the present invention.

FIG. 12 illustrates a fifth embodiment according to the present invention, particularly the peripheral structure of the right side header of the modulator integrated type refrigerant condenser. In this embodiment, by sticking the end edges of the opening side of a pair of molded plates 88 and 89 together, the modulator 33 is formed.

Specifically, a mounted part 90 having a flat plate-shaped cross-section which is to be joined to a flat part 85 of the right side header 32 is formed on the central part of one molded plate 88. On the other hand, two bulged parts 91 each having a roughly semi-cylindrical cross-section are formed on the front and rear sides of the mounted part 90 in the thickness direction of the core 30.

On the central part of the other molded plate 89 is formed a mounted part 94 of flat plate shape in cross-section and to be stacked and joined to the mounted part 90. In the front and rear sides of the mounted part 94 in the thickness direction of the core 30 are formed two bulged parts 95 of roughly semi-cylindrical shape in cross-section. The flange-like engagement part 62a which is to be coupled with the outer peripheral surface of the front end edge of the front side bulged part 91 of the mating molded plate 88 is formed on the front end edge of the opening side of the front side bulged part 95. On the other hand, the flange-like engagement part 62b which is to be coupled with the outer peripheral surface of the rear end edge of the opening side of the rear side bulged part 91 of the mating molded plate 51 is formed on the rear end edge of the opening side of the rear side bulged part 95.

Large parts of the right side header 32 and the modulator 33 have the cross-section shown in FIG. 12; however, inlet and outlet passages similar to those in the previous embodiments may be provided by forming recesses on one or both of mounted parts 90 and 94 to form passages connecting the interior 71 of the modulator 33 with the interior 67 of the right side header 32 via holes in the flat part 85.

In this embodiment, assuming that the internal volume of the modulator 33, i.e., the cross-section of the two second internal spaces (gas-liquid separation chambers) 71, are the same as that of the modulator 33 according to the first embodiment, the width of the modulator 33 can be reduced and the radial size of the modulator 33 can also be reduced. As a result, the width of the dead space which does not contribute to the heat exchange of the refrigerant with the outdoor air can further be reduced.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A modulator integrated type refrigerant condenser comprising:

a core including a plurality of tubes extending in a width direction of said core and being stacked in a height direction of said core;

a roughly cylindrical header connected to an end part of said core in said width direction of said core, said header having a first inner space extending in said height direction of said core; and a modulator connected to said header in said width direction of said core, said modulator having a plurality of additional inner spaces extending in said height direction of said core and a plurality of communication passages connecting said plurality of additional inner spaces with said first inner space, said modulator having a cross-sectional shape corresponding to a plurality of roughly cylindrical pipe bodies stacked in a thickness direction of said core.

2. The condenser of claim 1, said modulator comprising:

a roughly cylindrical modulator body having a partition part disposed therein to divide an interior of said modulator body into said plurality of additional inner spaces.

3. The condenser of claim 2, wherein said partition part divides said modulator body into two additional inner spaces.

4. The condenser of claim 1, wherein said plurality of communication passages includes an inlet and an outlet passage for each of said plurality of pipe bodies.

5. The condenser of claim 4, wherein a number of inlet passages and a number of outlet passages of said plurality of pipe bodies are each equal to a number of said plurality of pipe bodies.

6. The condenser of claim 1, wherein:

said header and said modulator collectively define at least one communication path between two of said plurality of additional inner spaces; and each of said communication paths passes through said header.

7. The condenser of claim 1, wherein:

each of said pipe bodies has at least two ends; and each of said pipe body ends is closed.

8. The condenser of claim 1, wherein said header and modulator are integrally formed by extrusion processing.

9. A modulator integrated type refrigerant condenser comprising:

a core including a plurality of tubes extending in a width direction of said core and being stacked in a height direction of said core;

a roughly cylindrical header connected to an end part of said core in said width direction of said core, said header having a first inner space extending in said height direction of said core; and a modulator connected to said header in said width direction of said core, said modulator having a plurality of additional inner spaces extending in said height direction of said core and a plurality of communication passages connecting said plurality of additional inner spaces with said first inner space;

wherein said header includes a flat mounting part on an outside surface of said header in said width direction of said core, and said modulator includes a flat mounted part on an inside surface of said modulator in said width direction of said core for mounting on said mounted part.

10. A modulator integrated type refrigerant condenser comprising:

a core having a condensing part for condensing and liquefying refrigerant by heat exchanging said refrigerant with a heat medium, and a supercooling part disposed in a position in said core lower than that of said condensing part for supercooling refrigerant by heat exchanging said refrigerant;

a header connected to an outlet of said condensing part at an end part of said core in a width direction of said core, said header having a first inner space extending in a height direction of said core, said header including a first partition part for dividing said first inner space into at least an upper side communication chamber connected to said outlet of said condensing part and a lower side communication chamber disposed at a position in said header lower than that of said upper side communication chamber and connected to said inlet of said supercooling part; and a modulator connected to said header in said width direction of said core, said modulator having a plurality of gas-liquid separation chambers extending in said height direction of said core, a first communication passage for connecting said upper communication chamber with said plurality of gas-liquid separation chambers, and a second communication passage for connecting said plurality of gas-liquid separation chambers with said lower side communication chamber.

11. The condenser of claim 10, said modulator comprising:

a roughly cylindrical modulator body having a second partition part disposed therein to divide an interior of said modulator body into said plurality of gas-liquid separation chambers.

12. The condenser of claim 11, wherein said second partition part divides said modulator body into two gas-liquid separation chambers.

13. The condenser of claim 10, wherein said modulator has a cross-sectional shape corresponding to a plurality of roughly cylindrical pipe bodies stacked in said width direction of said core.

14. The condenser of claim 10, wherein:

said header includes a flat mounting part on an outside surface of said header in said width direction of said core; and said modulator includes a flat mounted part on an inside surface of said modulator in said width direction of said core for mounting on said mounted part.

15. The condenser of claim 10, said modulator comprising:

a first bulged member disposed on a first side of said header, an interior surface of said first bulged member defining a first one of said plurality of gas-liquid separation chambers; and a second bulged member disposed on a second side of said header opposite said first side, an interior surface of said second bulged member defining a second one of said plurality of gas-liquid separation chambers.

16. The condenser of claim 15, wherein said header and said first and second bulged members are collectively formed by two molded plates having bulges formed therein to define said first inner space and said plurality of gas-liquid separation chambers.

17. The condenser of claim 15, wherein said first and second bulged members are collectively formed by two molded plates having bulges formed therein to define said plurality of gas-liquid separation chambers.

18. The condenser of claim 10, wherein said header and modulator are integrally formed by extrusion processing.

19. A modulator integrated type refrigerant condenser comprising:

a core including a plurality of tubes extending in a width direction of said core and being stacked in a height direction of said core;

a roughly cylindrical header connected to an end part of said core in said width direction of said core, said header having a first inner space extending in said height direction of said core; and a modulator connected to said header in said width direction of said core, said modulator having a plurality of additional inner spaces extending in said height direction of said core and a plurality of communication passages connecting said plurality of additional inner spaces with said first inner space, said modulator including a first bulged member disposed on a first side of said header, an interior surface of said first bulged member defining a first one of said plurality of additional inner spaces, and a second bulged member disposed on a second side of said header opposite said first side, an interior surface of said second bulged member defining a second one of said plurality of additional inner spaces.

20. The condenser of claim 19, wherein said header and said first and second bulged members are collectively formed by two molded plates having bulges formed therein to define said first inner space and said plurality of additional inner spaces.

21. The condenser of claim 19, wherein said first and second bulged members are collectively formed by two molded plates having bulges formed therein to define said plurality of additional inner spaces.

\* \* \* \* \*